United States Patent
Onaka

(10) Patent No.: US 8,620,160 B2
(45) Date of Patent: Dec. 31, 2013

(54) OPTICAL TRANSMISSION APPARATUS

(75) Inventor: Miki Onaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 509 days.

(21) Appl. No.: 12/169,454

(22) Filed: Jul. 8, 2008

(65) Prior Publication Data

US 2009/0016727 A1 Jan. 15, 2009

(30) Foreign Application Priority Data

Jul. 9, 2007 (JP) ................................. 2007-179480

(51) Int. Cl.
*H04J 14/02* (2006.01)

(52) U.S. Cl.
USPC ................... 398/79; 398/93; 398/94; 398/97; 398/177; 398/181; 398/25; 398/34; 398/38; 398/158; 398/159; 398/160

(58) Field of Classification Search
USPC ........................ 398/25–34, 79–83, 92–94, 97, 398/157–160, 173, 177, 181; 359/337.1, 359/337.13, 334
See application file for complete search history.

(56) References Cited

U.S. PATENT DOCUMENTS

| 6,359,726 | B1 * | 3/2002 | Onaka et al. | 359/337.1 |
| 6,381,064 | B1 * | 4/2002 | Terahara | 359/337.13 |
| 6,900,931 | B1 * | 5/2005 | Sridhar et al. | 359/337.1 |
| 2003/0048525 | A1 * | 3/2003 | Irie | 359/337.1 |
| 2003/0190166 | A1 * | 10/2003 | Sekine | 398/97 |
| 2003/0231886 | A1 * | 12/2003 | Young et al. | 398/101 |
| 2004/0091263 | A1 * | 5/2004 | Sakamoto | 398/45 |
| 2005/0024712 | A1 * | 2/2005 | Hiraizumi et al. | 359/334 |
| 2005/0036790 | A1 * | 2/2005 | Tanaka et al. | 398/177 |
| 2006/0222367 | A1 * | 10/2006 | Onaka et al. | 398/83 |

FOREIGN PATENT DOCUMENTS

| JP | 2003-529948 | 10/2003 |
| JP | 2004-153477 | 5/2004 |
| JP | 2006-279610 | 10/2006 |
| WO | WO 00/14909 | 3/2000 |

OTHER PUBLICATIONS

Office Action issued Feb. 7, 2012 in corresponding Japanese Patent Application No. 2007-179480.
Japanese Office Action for application No. 2007-179480 issued Nov. 6, 2012.

* cited by examiner

*Primary Examiner* — Li Liu
(74) *Attorney, Agent, or Firm* — Staas & Halsey LLP

(57) ABSTRACT

An optical transmission apparatus includes a reception part for receiving a wavelength division multiplexed (WDM) signal reached via optical amplifiers; a measuring part for measuring an optical power level of each wavelength of the WDM signal received by the reception part; a determination part for determining whether an amount of tilt of the WDM signal calculated based on measurement results of the measuring part is suitable or not; an operation part for calculating the tilt correction amount to be applied to tilt correction processing performed by the optical amplifiers if the amount of tilt of the WDM signal is not suitable; and a notification part for notifying the optical amplifiers of the tilt correction amount.

4 Claims, 12 Drawing Sheets

FIG. 5

| CH | IS/OOS | POWER [dBm] |
|---|---|---|
| 1 | IS | −15 |
| 2 | IS | −14 |
| 3 | IS | −13 |
| 4 | IS | −12 |
| 5 | OOS | N/A |
| 6 | OOS | N/A |
| . | . | . |
| . | . | . |
| . | . | . |
| . | . | . |
| 35 | IS | −10 |
| 36 | OOS | N/A |
| 37 | IS | −9 |
| 38 | IS | −8 |
| 39 | IS | −7 |
| 40 | IS | −6 |

FIG. 6

| NODE# | NODE TYPE | NUMBER OF ILAs | FIBER TYPE | LENGTH |
|---|---|---|---|---|
| 1 | OADM | | | |
| 2 | ILA | | SMF | 20 |
| 3 | ILA | | SMF | 40 |
| 4 | ILA | | SMF | 50 |
| 5 | OADM | 3 | SMF | 70 |
| . | . | | . | |
| . | . | | . | |
| . | . | | . | |
| . | . | | . | |
| 10 | OADM | | NZ-DSF | 30 |
| 11 | OADM | 0 | NZ-DSF | 35 |
| 12 | OADM | 0 | SMF | 55 |
| 13 | ILA | | NZ-DSF | 66 |
| 14 | OADM | 1 | NZ-DSF | 50 |

OPTICAL TRANSMISSION APPARATUS

CROSS-REFERENCE TO RELATED APPLICATIONS

This application is based upon and claims the benefit of priority to Japanese Patent Application No. 2007-179480, filed on Jul. 9, 2007, the entire contents of which are incorporated herein by reference.

BACKGROUND OF THE INVENTION

1. Field of the Invention

The present invention relates to an optical transmission apparatus for receiving a wave division multiplexed (WDM) light or an optical amplifier for relaying light between optical transmission apparatuses.

2. Description of the Related Art

Demands for wave division multiplex (WDM) transmission apparatuses are growing in recent years against the background of increased communication traffic. WDM transmission apparatuses have been actively introduced not only as optical repeating nodes in backbone networks, but also to local networks. Thus many optical add drop multiplexers (OADM) are arranged in a network.

A deviation of levels between wavelengths within a signal band occurs in these WDM network systems due to wavelength dependent losses (WDL) of fiber, stimulated Raman scattering (SRS), which is a nonlinear effect of fiber, WDL of various optical components within a node and the like.

Such a deviation of levels causes deterioration of the optical signal-to-noise ratio (OSNR) of light in a receiver input part, as well as deterioration of the dynamic range of light input and the transmission characteristics of a system.

Uniform and linear tilt corrections are conventionally made to tilt generated in each transmission path fiber to improve the transmission characteristics of a system.

The conventional tilt correction method makes uniform and linear tilt corrections in a relay amplifier for each transmission path fiber. However, appropriate tilt corrections are sometimes not realized because tilt may be generated as a difference from tilt correction amounts due to the distance of transmission path fiber, WDL, loss factor, different effective sectional area for each fiber type, transmission wavelength number and the like.

Such tilt accumulates when the system is viewed as a whole. Therefore, it is necessary to appropriately correct tilt generated in each transmission path fiber to improve OSNR in a receiver and level diagrams in a node, for the purpose of improving transmission characteristics of the system.

SUMMARY OF THE INVENTION

According to an aspect of an embodiment, an optical transmission apparatus comprises: a reception part for receiving a wavelength division multiplexed (WDM) signal reached via optical amplifiers; a measuring part for measuring an optical power level of each wavelength of the WDM signal received by the reception part; a determination part for determining whether an amount of tilt of the WDM signal calculated based on measurement results of the measuring part is suitable or not; an operation part for calculating the tilt correction amount to be applied to tilt correction processing performed by the optical amplifiers if the amount of tilt of the WDM signal is not suitable; and a notification part for notifying the optical amplifiers of the tilt correction amount.

The above-described embodiments of the present invention are intended as examples, and all embodiments of the present invention are not limited to including the features described above.

BRIEF DESCRIPTION OF THE DRAWINGS

FIG. 5 is a table showing a table example storing optical power levels by wavelength monitored by the OADM node on a receiving side;

FIG. 6 is a table showing an example of system configuration information (network configuration information) used for calculation of the tilt correction amount;

DETAILED DESCRIPTION OF THE PREFERRED EMBODIMENTS

Figure 1:
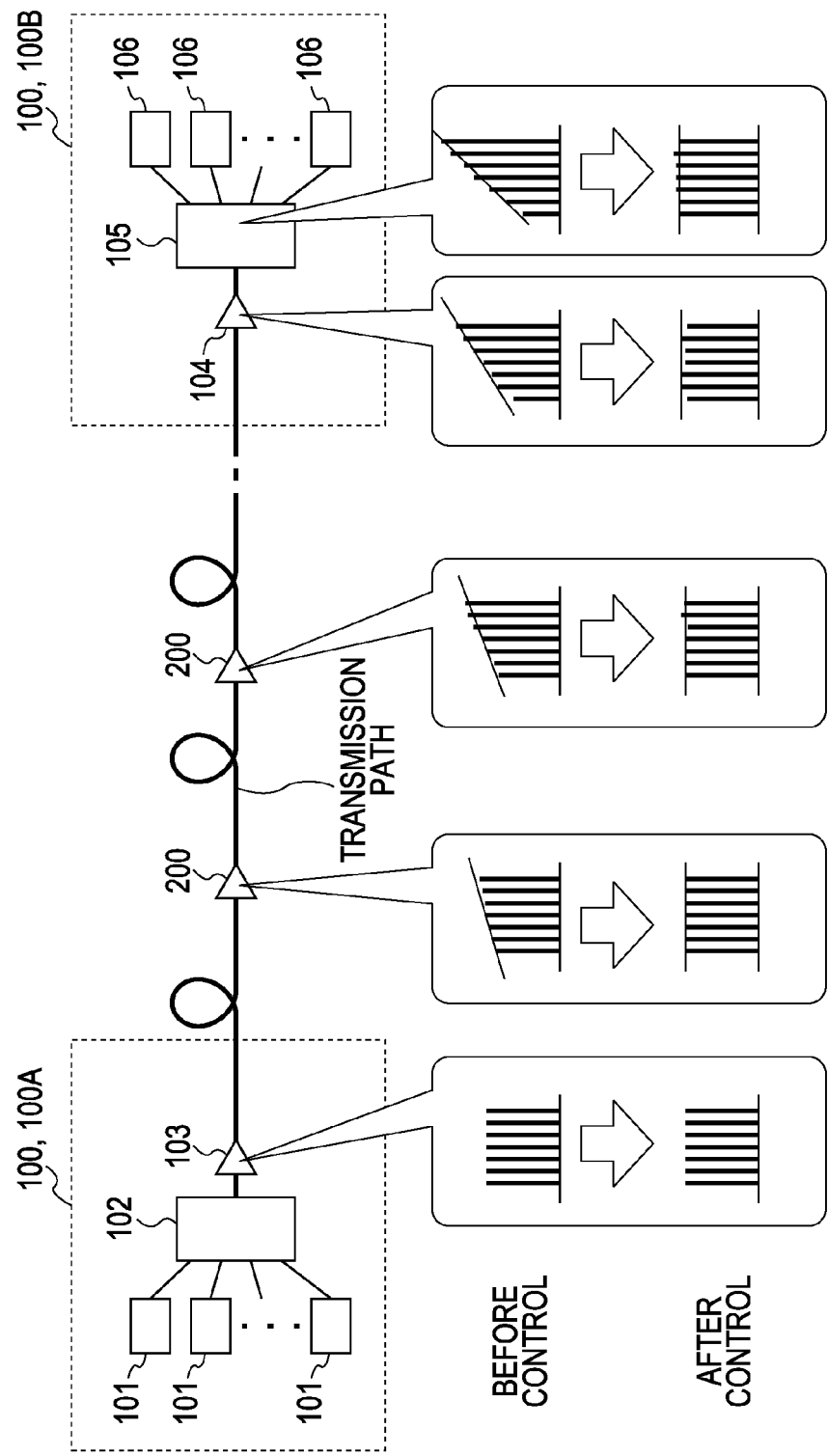
FIG. 1 is a diagram showing an example of an optical transmission system (linear configuration)

Reference may now be made in detail to embodiments of the present invention, examples of which are illustrated in the accompanying drawings, wherein like reference numerals refer to like elements throughout. Embodiments of the present invention will be described below with reference to the drawings.

Figure 2:
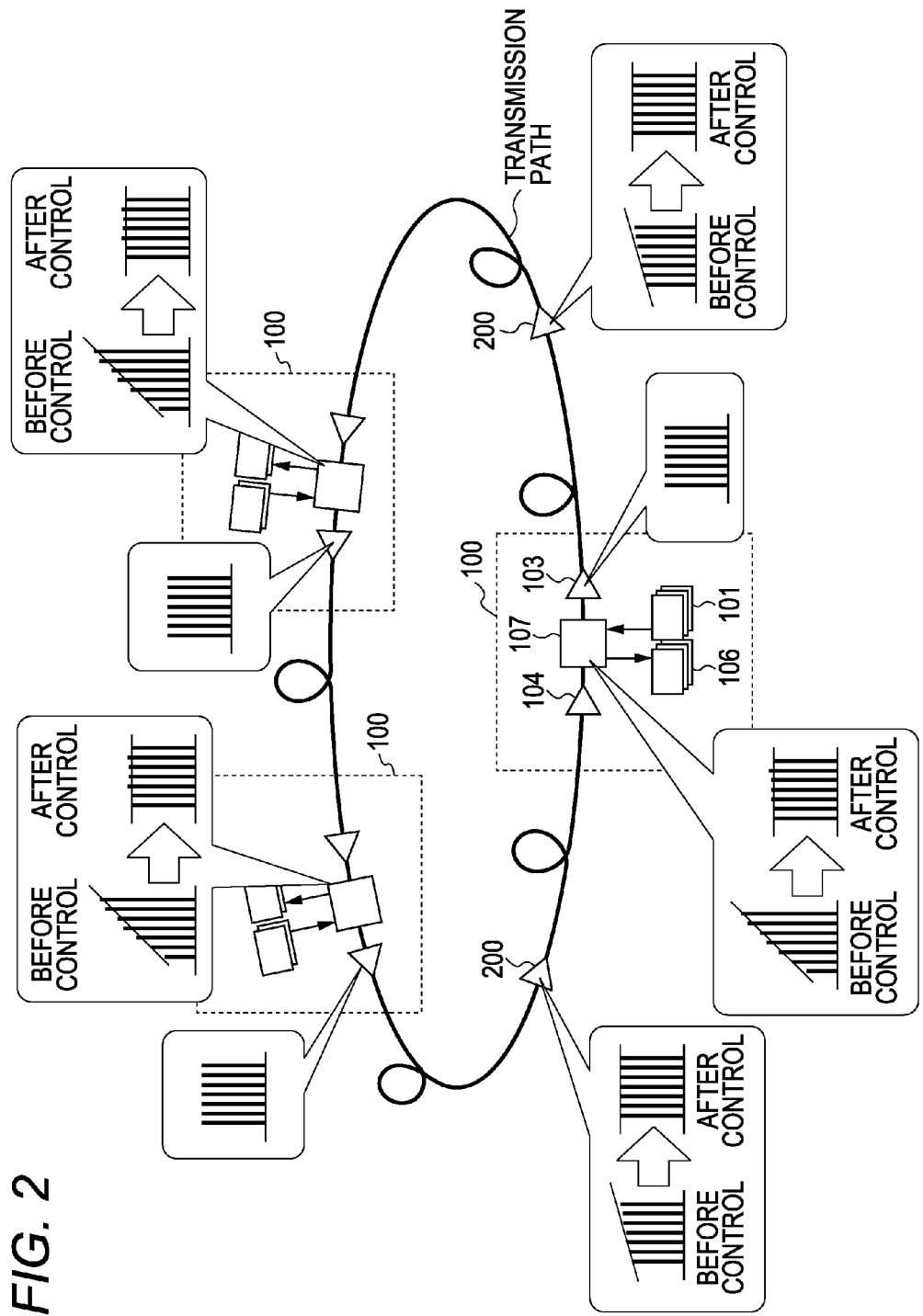
FIG. 2 is a diagram showing an example of an optical transmission system (ring configuration)

FIG. 1 is a diagram showing an example of an optical transmission system having a linear configuration and FIG. 2 is a diagram showing an example of an optical transmission system having a ring configuration. The present embodiment is applicable to both the linear configuration and the ring configuration. Incidentally, while an actual optical transmission system has optical transmission paths in both directions, the optical transmission systems in FIGS. 1 and 2 omit an optical transmission path in one direction.

In FIG. 1, the optical transmission system has one or more relay amplifiers (ILA nodes (optical in-line amplifier equipment)) 200 arranged between an OADM node 100 (100A) on a transmitting side of optical signals and an OADM node 100 (100B) on a receiving side. The ILA node 200 is an optical amplifier repeater having an optical amplification function set up on a fiber transmission path to compensate for fiber losses and a function to compensate for fiber dispersion. The OADM node corresponds to an optical transmission apparatus and the ILA node corresponds to an optical amplifier.

A transmission path (optical fiber) establishes connection between the OADM node 100 and the ILA node 200 and also between the ILA nodes 200. In this manner, the OADM node 100A and the OADM node 100B are linearly (serially) connected by transmission paths and the ILA nodes.

The OADM node 100A includes, as components to transmit an optical signal to a transmission path, a plurality of transmitters 101, a multiplexer 102 for multiplexing a plurality of optical signals having different wavelengths transmitted from the plurality of transmitters 101, and a transmission amplifier (for example, EDFA (erbium doped fiber amplifier)) 103 for amplifying an optical signal multiplexed by the multiplexer 102 to transmit the optical signal to a transmission path.

The OADM node 100B, on the other hand, includes, as components to receive an optical signal from a transmission path, a reception amplifier (for example, EDFA) 104 for amplifying a wave division multiplexed optical signal from a transmission path, a demultiplexer 105 for demultiplexing the wave division multiplexed optical signal into each wavelength, and a plurality of receivers 106 for receiving each demultiplexed wavelength.

Incidentally, an actual OADM node comprises all components included in the OADM node 100A and the OADM node 100B.

Moreover, the transmission amplifier 103, each relay amplifier (the ILA node 200), the reception amplifier 104, and the demultiplexer 105 comprise a tilt correction part for correcting power tilt (gain tilt: tilt) between wavelengths generated in wavelength spectra of a received multiplexed optical signal.

In the optical transmission system shown in FIG. 2, a plurality of OADM nodes 100 is connected in a ring shape via a transmission path (optical fiber), and the ILA node 200 is inserted on a transmission path between the OADM nodes when needed. The OADM node 100 shown in FIG. 2 has components combining those of the OADM node 100A and those of the OADM node 100B, and comprises a multi/demultiplexer having functions of both the multiplexer 102 and the demultiplexer 105 shown in FIG. 1 and an optical switch 107.

Figure 3:
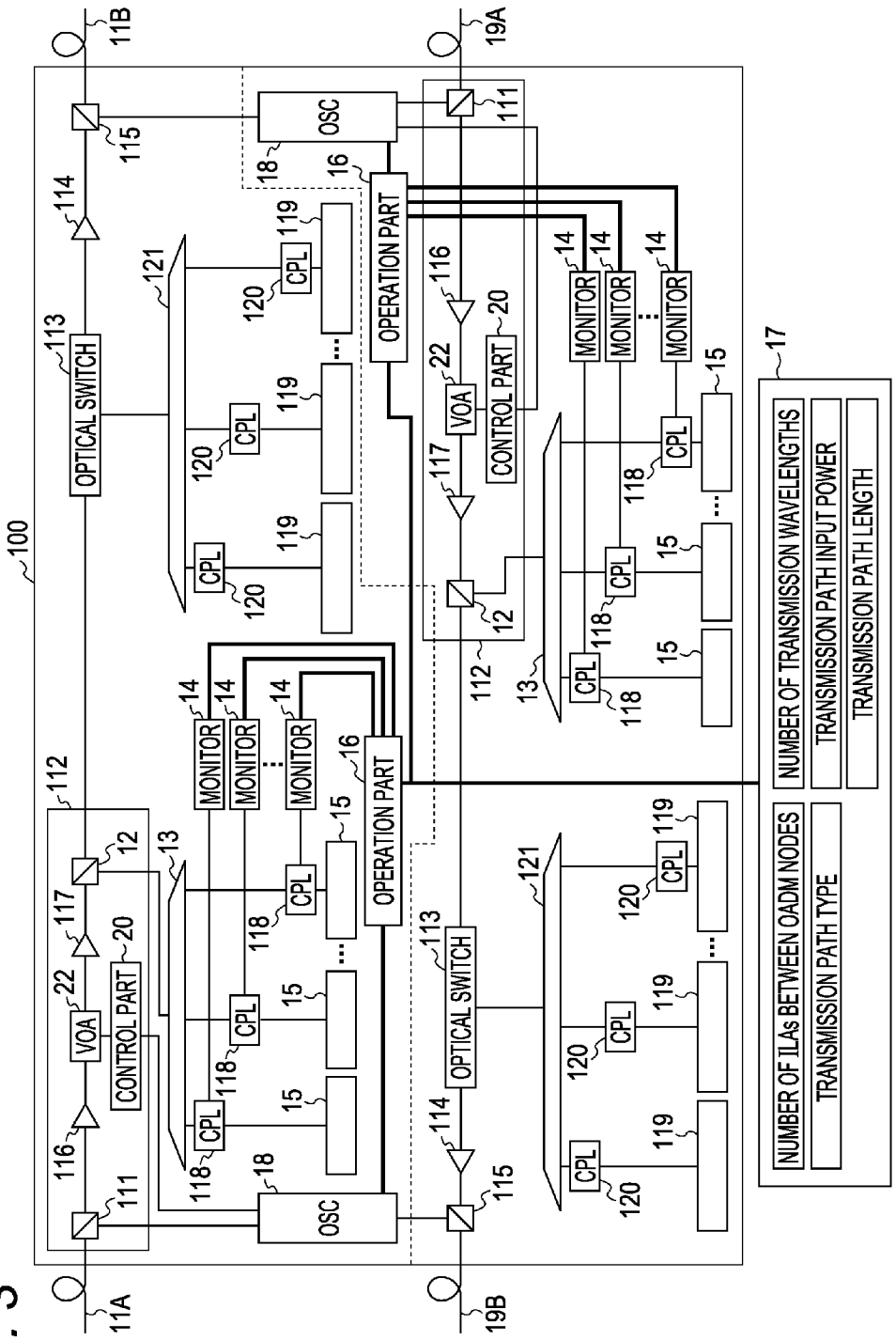
FIG. 3 is a diagram exemplifying the configuration of an OADM node (optical signal transmission/reception apparatus) applicable to the optical transmission systems shown in FIGS. 1 and 2.

FIG. 3 shows a schematic diagram of the configuration inside an OADM node. In FIG. 3, the OADM nodes 100 is comprised of a first unit (a part above a broken line in FIG. 3) involving a first direction (a transmission path (optical fiber) 11A→a transmission path 11B: up direction) and a second unit (a part below the broken line in FIG. 3) involving a second direction (a transmission path (optical fiber) 19A→a transmission path 19B: down direction).

Since the first unit and the second unit have the same configuration, the first unit is taken as an example for describing the unit. The first unit has an amplifier unit 112 to which a wave division multiplexed signal (WDM signal) from the transmission path 11A is coupled. The amplifier unit 112 has a demultiplexer 111, which demultiplexes a wavelength for an optical interface for monitoring (OSC: optical service channel) from the WDM signal transmitted from the transmission path 11A to input the wavelength to an OSC processing part 18.

The amplifier unit 112 is connected to an optical switch 113, which is connected to an optical amplifier (for example, EDFA) 114, which is connected to an optical multiplexer 115. The optical multiplexer 115 is connected to the transmission path 11B.

The amplifier unit 112 comprises the above demultiplexer 111, an optical amplifier 116 for amplifying a WDM signal from the demultiplexer 111, a variable optical attenuator (VOA) 22 for adjusting power of each wavelength of the WDM signal from the optical amplifier 116, a control part 20 for controlling the operation of the VOA 22, an optical amplifier 117 for amplifying the WDM signal output from the VOA 22, and an optical splitter 12 connected to the optical amplifier 117. The optical splitter 12 causes the WDM signal output from the optical amplifier 117 to split into two WDM signals, one of which is coupled to the optical switch 113 and the other WDM signal is coupled to a demultiplexer 13 (the WDM signal is dropped).

The demultiplexer 13 demultiplexes the WDM signal into a plurality of wavelengths and transmits each wavelength to a plurality of receivers 15. An optical coupler (CPL) 118 is inserted between the demultiplexer 13 and each receiver 15. A light branched from the CPL 118 is coupled to one of monitor photo diodes (PDs) 14 as measuring parts to measure the power level of each wavelength prepared for each of a plurality of wavelengths that can be output by the demultiplexer 13. Each monitor PD 14 is connected to an operation part 16, which is connected to an OSC processing part 18.

The operation part 16 is also connected to a device control part 17. The device control part 17 is a computer for controlling the OADM node 100 and is comprised of a control part (such as a CPU), a storage device, an input/output interface, an input device, an output device and the like. Data used by the operation part 16, for example, the number of ILAs between OADM nodes, the number of transmission wavelengths, transmission path type, transmission path input power, and transmission path length are stored in the storage device provided with the device control part 17.

The first unit also has a plurality of transmitters 119 and an optical signal of each wavelength output from each of the transmitters 119 is input to a multiplexer 121 via an optical coupler (CPL) 120. The multiplexer 121 inputs an optical signal obtained by multiplexing lights of a plurality of wavelengths from the plurality of transmitters 119 to the optical switch 113. The optical switch 113 adds the optical signal from the multiplexer 121 to the transmission path before transmission to the optical amplifier 114.

The OSC processing part 18 of the first unit is capable of receiving an OSC signal demultiplexed by the demultiplexer 111 to pass information contained in the OSC signal to the operation part 16. The OSC processing part 18 also generates an OSC signal containing information input from the operation part 16 to input the OSC signal to the multiplexer 115 in the down direction (second unit). Accordingly, the OSC signal can be fed back to an upstream node using the transmission path 19B in the down direction.

In the configuration example shown in FIG. 3, the plurality of transmitters 119 correspond to the transmitters 101 in FIGS. 1 and 2. The multiplexer 121 corresponds to the multiplexer 102 shown in FIG. 1. The optical amplifier 114 corresponds to the transmission amplifier 103 shown in FIGS. 1 and 2. The amplifier unit 112 (the optical amplifier 116 and optical amplifier 117) corresponds to the reception amplifier 104 shown in FIGS. 1 and 2. The demultiplexer 13 corresponds to the demultiplexer 105 shown in FIG. 1. The plurality of receivers 15 corresponds to the plurality of receivers 106 shown in FIGS. 1 and 2. Then, the demultiplexer 13, the optical switch 113, and the multiplexer 121 correspond to the multi/demultiplexer and the optical switch 107 shown in FIG. 2.

Further, the amplifier unit 112 corresponds to a reception part in the optical transmission apparatus, the plurality of monitor PDs 14 corresponds to the measuring parts, the operation part 16 corresponds to a determination part and operation part, and the OSC processing part 18 corresponds to a notification part.

Figure 4:
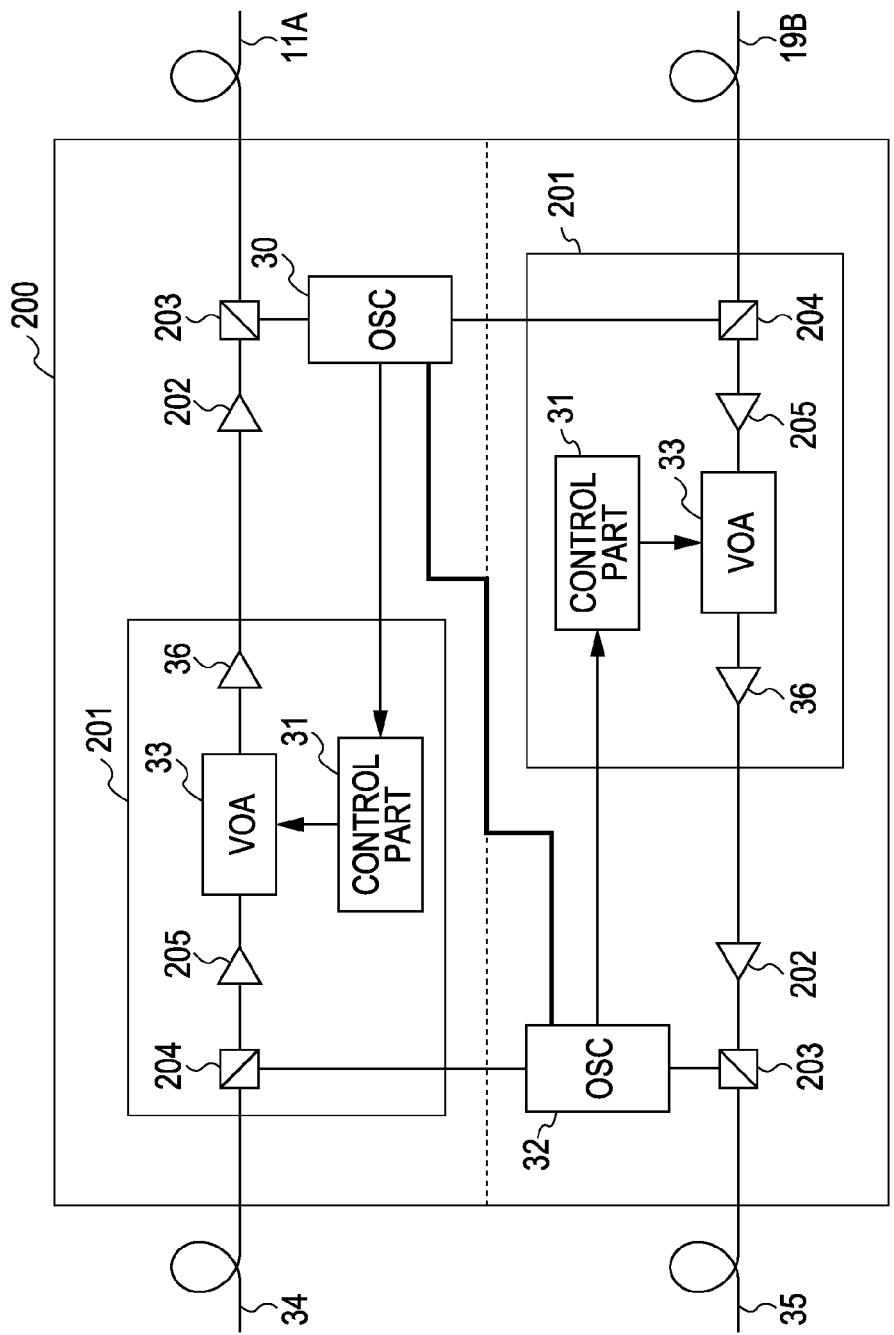
FIG. 4 is a diagram exemplifying the configuration of an ILA node (repeater apparatus) applicable to the optical transmission systems shown in FIGS. 1 and 2.

FIG. 4 is a diagram exemplifying the configuration of the ILA node applicable to the optical transmission systems shown in FIGS. 1 and 2. In FIG. 4, the ILA node 200 is comprised of a first unit (a part above a broken line in FIG. 4) involving optical signal processing in the up direction (in FIG. 4, the direction from a transmission path (optical fiber) 34 to the transmission path 11A) and a second unit (a part below the broken line in FIG. 4) involving optical signal processing in the down direction (in FIG. 4, the direction from the transmission path 19B to a transmission path 35).

Since the first unit and the second unit have the same configuration, the first unit is taken as an example for describing the unit. The first unit comprises an amplifier unit 201, an optical amplifier (transmission amplifier: for example EDFA) 202, and a multiplexer 203 disposed between the transmission path 34 and the transmission path 11A.

The amplifier unit 201 comprises a demultiplexer 204 for demultiplexing an OSC signal from a WDM signal transmitted from the transmission path 34, an optical amplifier (EDFA) 205 for amplifying the WDM signal output from the demultiplexer 204, a variable optical attenuator (VOA) 33 for adjusting power of each wavelength of the WDM signal output from the optical amplifier 205, an optical amplifier (EDFA) 36 for amplifying the WDM signal output from the VOA 33, and a control part 31 for controlling operations of the VOA 33, and output of the optical amplifier 36 is coupled to the optical amplifier 202.

The first unit also includes an OSC processing part 30 for outputting an OSC signal, which is multiplexed with a WDM signal from the optical amplifier 202 by the multiplexer 203. The OSC processing part 30 receives an OSC signal demultiplexed from a WDM signal in the down direction by the demultiplexer 204 in the second unit and inputs information (the tilt correction amount from a downstream OADM node) in the OSC signal to the control part 31. Accordingly, the control part 31 in the first unit can control operations of the VOA 33 according to the information from the OSC processing part 30 (by the amount of control in accordance with the tilt correction amount). Further, the OSC processing part 30 is connected to an OSC processing part 32 of the second unit.

Incidentally, the OSC processing part 30 corresponds to the reception part in the optical amplifier, the VOA 33 corresponds to the variable optical attenuator, and the control part 31 corresponds to the control part in the optical amplifier.

An outline of operations of the optical transmission systems shown in FIGS. 1 to 4 will be given based on FIGS. 3 and 4. It is assumed in the network configuration shown in FIG. 1 or 2 that a WDM signal is transmitted from the OADM node 100 on the transmitting side to the OADM node 100 on the receiving side via one or more of the ILA nodes 200.

When the apparatus (the OADM node 100) is initially started up, an optical signal of each wavelength output by each transmitter (the transmitter 119) is multiplexed by the multiplexer 121 configuring an add part inside the OADM node 100 to generate a WDM signal. After the level thereof being adjusted by the optical switch 113, the WDM signal is input to the transmission amplifier (the optical amplifier 114) in a state in which there is no level deviation among wavelengths and, after amplification by the optical amplifier 114, is output to a fiber (transmission path).

The WDM signal output from the transmission amplifier (the optical amplifier 114) is in a state in which tilt is generated among wavelengths due to fiber losses or SRS.

In the relay amplifier (the ILA node 200) receiving a WDM signal output from the OADM node 100 on the receiving side, the amplifier unit 201 (the VOA 33 and the control part 31) of the ILA node 200 operates in such a way to correct tilt using the tilt correction amount set by default for the ILA node 200 in order to correct tilt generated between wavelengths described above for the WDM signal received from the OADM node 100.

Here, if there is a difference between the amount of tilt generated on the transmission path and the tilt correction amount by the relay amplifier (the ILA node 200), there remains tilt in output from the relay amplifier (the ILA node 200). Thus, if there is a difference between the tilt correction amount preset for each relay amplifier and the amount of tilt generated on the transmission path, tilt in the whole optical transmission path will accumulate.

A WDM signal in which tilt is accumulated before reaching the OADM node 100 on the receiving side is amplified by the amplifiers (the optical amplifiers 116 and 117) inside the OADM node 100 and then demultiplexed by the demultiplexer 13. At this point, the power level of light of each wavelength is monitored by the monitor PDs 14 prepared for all wavelengths demultiplexed by the demultiplexer 13, before being fetched by the tilt operation part (operation part 16) inside the OADM node 100.

The operation part 16 has, in addition to the optical level monitor value from each PD 14, system configuration information transferred in advance from the control device (the device control part 17) outside the apparatus (OADM node 100).

The system configuration information contains, for example, the number of the ILA nodes 200 between the OADM nodes 100, wavelength arrangement, the number of wavelengths, fiber type, and transmission distance. The operation part 16 calculates the amount of tilt generated between the OADM nodes 100 from the above information.

Short and long wavelength bands can be distinguished by information about the wavelength arrangement being used by the operation part 16 for calculating the amount of tilt. The operation part 16 calculates average levels of the short and long wavelength bands from the fetched information. The calculation formula is as shown below (CH is a channel).

Average level of short wavelength band CHAve1 [dBm]=(CH$a$ monitor value+CH$b$ monitor value+ . . . +CH$g$ monitor value)/number of channels to be calculated Average level of long wavelength band CHAve2 [dBm]=(CH$t$ monitor value+ . . . +CH$y$ monitor value+ . . . +CH$z$ monitor value)/number of channels to be calculated From these two values, the operation part 16 calculates the amount of tilt (initial value) [dB] between the OADM nodes 100.

Amount of tilt (initial value) [dB]=average level of long wavelength band CHAve2−average level of short wavelength band CHAve1

The operation part 16 calculates the tilt correction amount (initial value) [dB] needed for each of the ILA nodes 200 from the calculated amount of tilt (initial value) [dB] and the number of the ILA nodes 200 between the OADM nodes 100 that has been fetched. "1" in the formula denotes the amplifier (the amplifier unit 112) inside the OADM node 100.

Correction amount of each node [dB]=initial tilt value [dB]/(number of ILAs between OADM nodes+1)

Information containing the calculated tilt correction amount in each of the ILA nodes 200 is transferred to each upstream ILA node for notification using an OSC signal (the OSC processing part 18). Information about the tilt correction amount notified by the OSC signal is received by the OSC processing part 30 as a reception part before being fetched by the operation part (the amplifier unit 201) inside each of the upstream ILA nodes 200 via the OSC processing part 30.

That is, in the ILA node 200 shown in FIG. 4, the control part 31 inside the amplifier unit 201 is notified of an amount of change in gain corresponding to the notified amount of tilt via the OSC processing part 30. The control part 31 controls the VOA 33 in accordance with the amount of change in gain. That is, the control part 31 adjusts an excessive or insufficient amount with respect to the amount of VOA (variable optical attenuator) corresponding to the present tilt correction amount.

Amount of VOA control [dB]=VOA amount corresponding to the preset tilt correction amount+amount of VOA control corresponding to the tilt correction amount As soon as control in all of the ILA nodes 200 is completed, the monitor PD 14 in the above OADM node 100 on the receiving side monitors the level of each wavelength and the operation part 16 determines whether or not tilt is within a reference value so that whether to complete tilt corrections is automatically determined.

According to the present embodiment, the receiving OSNR can be made suitable by allocating tilt generated between the OADM nodes 100 to each amplifier (optical amplifier: the ILA node 200) for re-correction of tilt. As a result, transmission characteristics of an optical signal are improved.

Transmission characteristics can be made suitable by applying the present embodiment also when wavelengths are increased/decreased. Deterioration of node characteristics can be avoided by correcting tilt generated between the OADM nodes 100 together by the amplifier (optical amplifier: the amplifier unit 112) of the OADM node 100 on the receiving side. Costs of the ILA nodes can also be reduced by distributing the tilt correction amount at an average level to each relay amplifier (the ILA node 200).

Next, operations of the OADM node 100 and the ILA node 200 will be described in detail using FIGS. 3 and 4. In the OADM node 100 shown in FIG. 3, a WDM signal transmitted by the transmission path 11A is received by the amplifier unit 112. The WDM signal branched by the optical splitter 12 of the amplifier unit 112 is demultiplexed into each wavelength by the demultiplexer 13.

Optical signals of each demultiplexed wavelength are input to the plurality of receivers 15 and the plurality of monitor PDs 14 of optical level. The optical power level of each wavelength measured by each monitor PD 14 is fetched by the operation part 16.

FIG. 5 exemplifies a data storage table storing optical power levels fetched by the operation part 16 in FIG. 3. This table is created in a recording medium (storage device) held by the operation part 16. As shown in FIG. 5, In service (IS) or Out of service (OOS) and the optical power level are stored in the table for each wavelength channel (CH).

Based on such data of the optical power level, the operation part 16 calculates the average power levels for the short and long wavelength bands in the following manner. At this point, data of the optical power level of In service is extracted from each of the short and long wavelength bands to be used for calculating the average level.

Average level of short wavelength band CHAve1
[dBm]={(−15)+(−14)+(−13)+(−12)}/4=−13.5

Average level of long wavelength band CHAve2
[dBm]={(−10)+(−9)+(−8)+(−7)+(−6)}/5=−8.0

The long wavelength band and short wavelength band are defined on the basis of the maximum number of channels of the system (the OADM node 100). For example, if the maximum number of channels is m, CH1 to CH(m/2) are defined as the short wavelength band and CH[(m/2)+1] to CHm are defined as the long wavelength band.

The operation part 16 calculates the average power level based on information of channels in operation (In service (IS)) and unused channels (Out of service (OOS)) and the stored power level in the long wavelength band and short wavelength band.

Next, the operation part 16 in FIG. 3 calculates the amount of tilt as shown below.

Amount of tilt (initial value) [dB]=−8.0−(−13.5)=5.5

Next, the operation part 16 calculates the correction amount of each ILA node 200. FIG. 6 exemplifies a system configuration information table stored in a storage device of the device control part 17 in FIG. 3. The operation part 16 uses, for example, the number of ILA nodes between the OADM nodes contained in the system configuration information fetched from the device control part 17 to calculate the correction amount. If there are four ILA nodes between the OADM nodes 100, for example, the operation part 16 calculates the correction amount of each node as show below.

Correction amount of each node [dB]=5.5/(4+1)=1.1

The operation part 16 notifies the OSC processing part 18 of the calculated correction amount of each node (for example, "1.1" described above). After receiving a notification of the correction amount of each node, the OSC processing part 18 transmits an OSC signal containing the correction amount from the transmission path 19B to transfer the OSC signal to the ILA node 200 upstream from the transmission path 11A (downstream of the transmission path 19B). The same procedure is performed for the opposite direction (down direction in FIG. 3: second unit) and thus, a description thereof is omitted.

When the correction amount of each node is received, the OSC processing part 18 also notifies the control part 20 inside the amplifier unit 112 of the correction amount. After receiving the notification, the control part 20 controls the operation of the VOA 22 with the amount of VOA control in accordance with the correction amount. The VOA 22 makes a tilt correction so that the power level of each wavelength in a WDM signal becomes flat.

In the ILA node 200 in FIG. 4, the correction amount of each node received from the OSC processing part 18 in the downstream OADM node 100 via the transmission path 19B is received by the OSC processing part 30 via the demultiplexer 204 inside the ILA node 200.

The OSC processing part 30 transfers the correction amount to the control part 31 and the OSC processing part 32 inside the amplifier unit 201. The OSC processing part 32 transfers the correction amount to the transmission path 35 via the multiplexer 203 to notify the ILA node 200 positioned further upstream of the correction amount.

The control part 31 inside the amplifier unit 201 realizes a tilt correction by controlling the VOA 33 with the amount of VOA control in accordance with the transferred correction amount. The correction amount is transferred also to the ILA node 200 upstream from the transmission path 34 (downstream of the transmission path 35) and a similar tilt connection through control of the VOA 33 is also made in the ILA node upstream from the ILA node 200 (The level of each wavelength of a WDM signal is made flat). Further, a similar procedure is performed also for the ILA nodes in the up direction.

When control of the VOA 22 and the VOA 33 in the amplifier unit 112 of the OADM node 100 on the receiving side in FIG. 3 and the amplifier unit 201 of each ILA node positioned upstream from the amplifier unit 112 is completed, the operation part 16 determines whether or not tilt is within a threshold (reference range). If tilt is within the threshold, the operation part 16 regards the tilt correction completed and terminates processing of the tilt correction. If tilt is not within the threshold, the operation part 16 makes a tilt correction again by performing the same procedure. The operation part 16 can know completion of control in each ILA node 200 by monitoring for an OSC signal from the upstream side.

Figure 7:
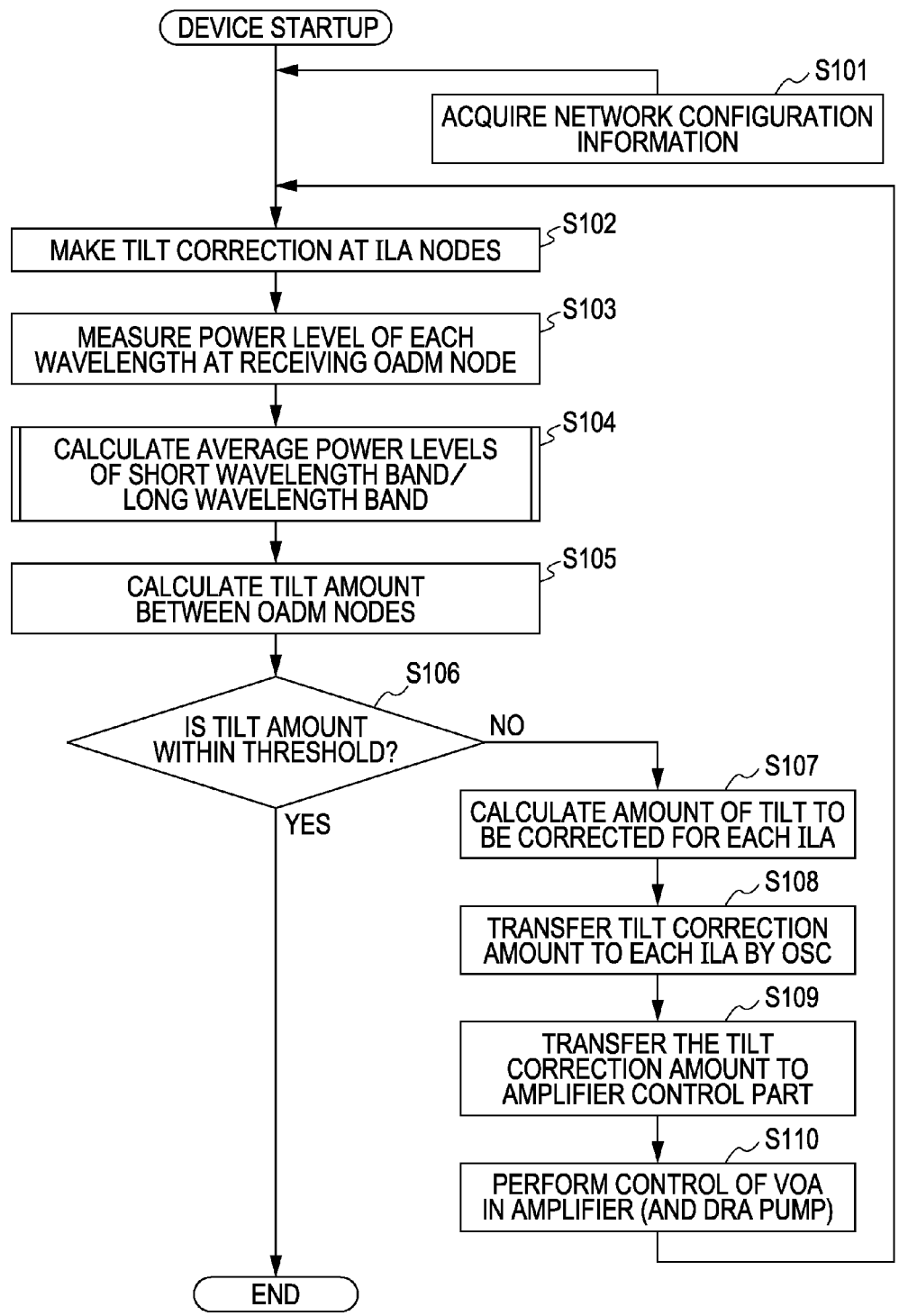
FIG. 7 is a control flow chart showing an example of a tilt correction process.
Figure 8:
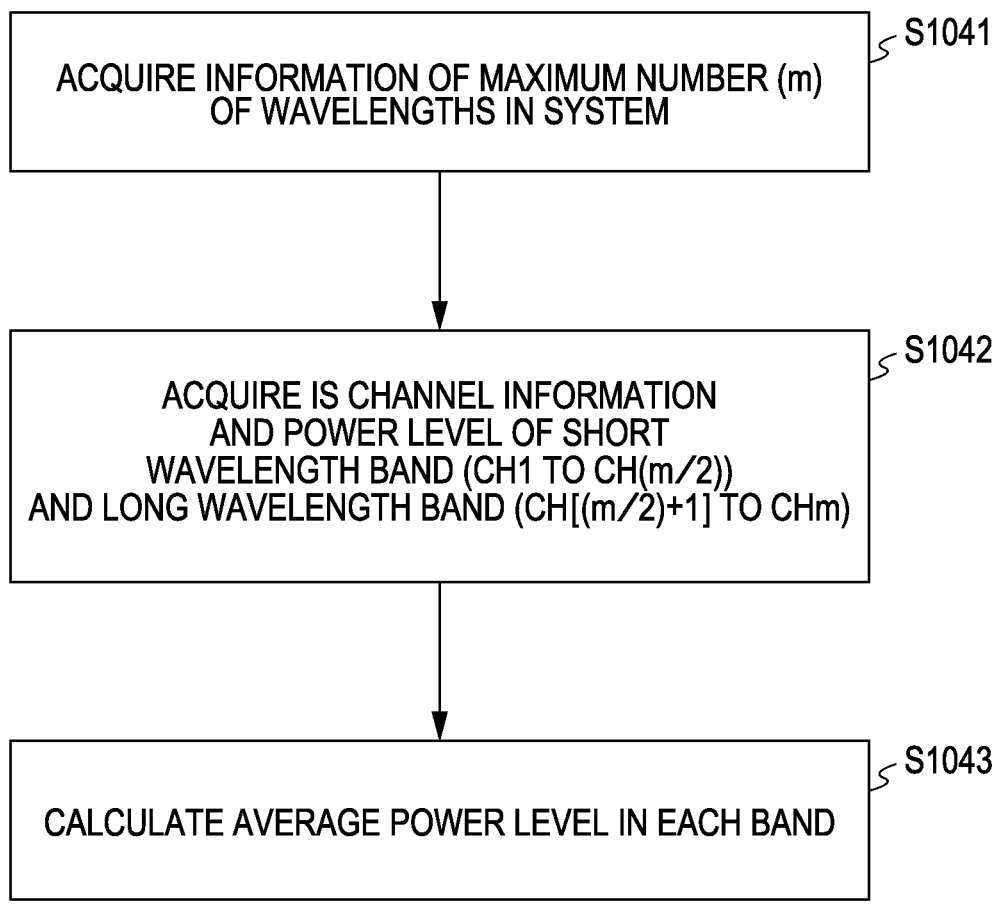
FIG. 8 is a flow chart showing an example of grouping processing of short and long wavelength bands performed in the tilt correction processing shown in FIG. 7.

FIG. 7 is a flow chart showing a control example involving a tilt correction, and FIG. 8 is a flow chart showing information collection processing of short and long wavelength bands contained in the process shown in FIG. 7.

The process shown in FIG. 7 is started by, for example, some OADM node 100 in FIG. 3 being turned on (device startup) in the optical transmission systems shown in FIGS. 1 and 2.

First, each of the operation parts 16 of the first unit (up direction) and the second unit (down direction) of the OADM node 100 fetches system configuration information (network configuration information in FIG. 6) stored in the device control part 17 (operation S101).

Next, in the up direction, for example, while a WDM signal is transmitted from the OADM node 100 on the transmitting side to the OADM node 100 on the receiving side, a tilt correction based on the default correction amount is made in one or more of the ILA nodes 200 present between the OADM nodes 100 (operation S102).

Next, in the first unit of the OADM node 100 on the receiving side, the power level of each wavelength in the WDM signal received from the transmission path 11A is measured by the monitor PD 14 and the operation part 16 is notified of the power level (operation S103). The operation part 16 creates a table as shown in FIG. 5.

Next, the operation part 16 calculates the average power level for the short wavelength band and long wavelength band (operation S104). That is, as shown in FIG. 8, the operation part 16 acquires the maximum number m of wavelengths of the system at operation S104 (operation S1041).

Next, the operation part 16 defines CH1 to CH(m/2) as the short wavelength band and CH[(m/2)+1] to CHm as the long wavelength band, and acquires IS channel information and the power level of the IS channel of the short wavelength band and long wavelength band (operation S1042).

Next, based on acquired information, the operation part 16 calculates the average power level of the short wavelength band and long wavelength band (operation S1043). Accordingly, the average power level CHAve1 [dBm] of the short wavelength band and the average power level CHAve2 [dBm] of the long wavelength band are calculated.

Next, returning to FIG. 7, the operation part 16 calculates the amount of tilt between the OADM nodes by subtracting the average power level CHAve1 [dBm] of the short wavelength band from the average power level CHAve2 [dBm] of the long wavelength band (operation S105).

Next, the operation part 16 determines whether or not the amount of tilt is within a threshold, which indicates a suitable range (operation S106). If the amount of tilt is within the threshold (S106: YES), the operation part 16 terminates tilt correction processing. If, on the other hand, the amount of tilt is not within a threshold (S106: NO), the operation part 16 calculates the amount of tilt to be corrected (tilt correction amount) for each ILA node 200 (operation S107).

Next, the operation part 16 notifies the OSC processing part 18 of the amount of tilt and the OSC processing part 18 transfers the tilt correction amount toward each of the upstream ILA nodes 200 (operation S108). That is, the OSC processing part 18 transfers an OSC optical signal containing the tilt correction amount toward the multiplexer 115 in the second unit (down direction). The OSC optical signal is sent out to the transmission path 19B after being multiplexed with a WDM signal from the optical amplifier 114 by the multiplexer 115 to be transmitted to the upstream ILA nodes 200.

The OSC processing part 18 also transfers the tilt correction amount to the amplifier control part (the control part 20 of the amplifier unit 112) (operation S109). Then, the control part 20 of the amplifier unit 112 controls the VOA 22 by calculating the amount of control of VOA based on the tilt correction amount to make tilt corrections so that power of each wavelength in the WDM signal becomes flat (operation S110). That is, wavelengths having power higher than a predetermined value are caused to attenuate so that power of each wavelength becomes flat. Then, the process returns to operation S102.

In each of the upstream ILA nodes 200, tilt corrections are made based on the tilt correction amount (operation S102). More specifically, in the ILA node 200, a WDM signal received from the transmission path 19B is input to the amplifier unit 201 of the second unit (down direction), an OSC signal in the WDM signal is demultiplexed by the demultiplexer 204, and the OSC signal is input to the OSC processing part 30 of the first unit (up direction). The OSC processing part 30 extracts the tilt correction amount to be applied at the local node from the OSC signal and provides the extracted tilt correction amount to the control part 31 inside the amplifier unit 201 of the first unit.

The control part 31 controls the VOA 33 with the amount of control in accordance with the provided tilt correction amount and the VOA 33 makes tilt corrections of a WDM signal received from the transmission path 34 in the same manner as the VOA 22 in the OADM node 100 (Wavelengths having higher power are caused to attenuate so that power of each wavelength becomes flat). Accordingly, the tilt of the WDM signal sent out to the transmission path 11A is improved.

The OSC processing part 30 notifies the OSC processing part 32 of the second unit of an OSC signal containing the tilt correction amount notified from the OADM node 100. The OSC processing part 32 sends out the OSC signal containing the tilt correction amount to the multiplexer 203. The OSC signal is sent out to the transmission path 35 after being multiplexed with the WDM signal by the multiplexer 203. In this manner, the upstream ILA nodes connected to the ILA node 200 via the transmission path 35 can be notified of the tilt correction amount from the OADM node 100. Tilt corrections described above are made in the upstream ILA nodes.

Then, loop processing of operations S102 to S110 is repeatedly performed until the amount of tilt falls within the threshold.

According to the present embodiment, as shown in FIGS. 1 and 2, a WDM signal from the transmission amplifier of the OADM node 100 on the transmitting side is output in a state in which the power level is flat among wavelengths. However, before automatic tilt correction processing shown in FIG. 7, tilt is generated in a relay amplifier due to a difference between the amount of tilt and the default tilt correction amount (See spectra on the upper side in FIG. 1 and on the left side in FIG. 2).

On the other hand, if automatic tilt correction processing is performed as shown in FIG. 7, the power level of each wavelength of a WDM signal output from each ILA node and the OADM node on the receiving side becomes flat (See spectra on the lower side in FIG. 1 and on the right side in FIG. 2).

The OSNR of the received WDN signal can be made suitable by suitable tilt corrections being made by the ILA nodes and the OADM node on the receiving side in this manner so that transmission characteristics of the WDM signal can be improved.

Next, another embodiment will be described. This embodiment has components common to those in the above embodiment and thus, differences will mainly be described.

Figure 9:
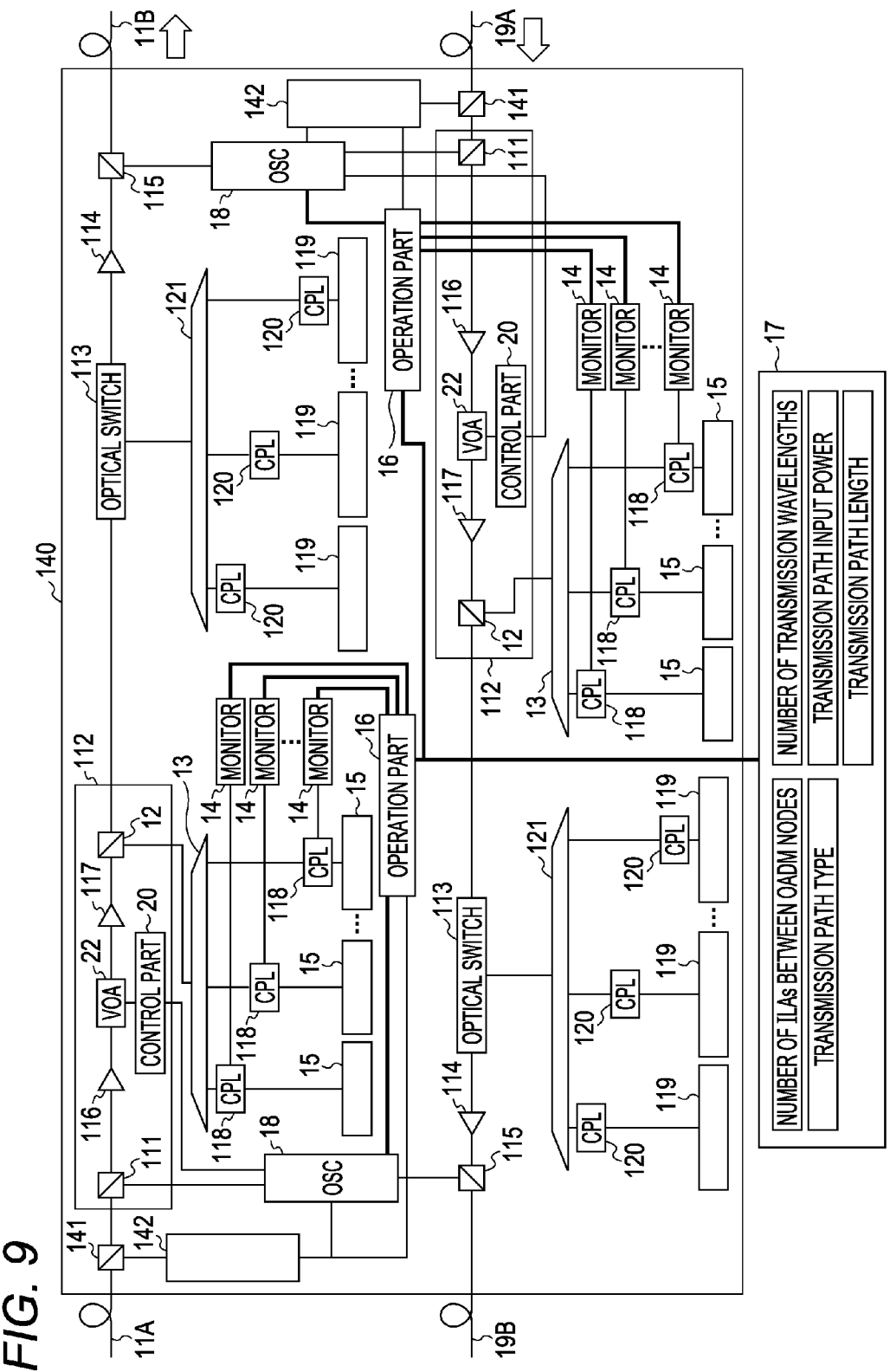
FIG. 9 is a diagram exemplifying the configuration of an OADM node (DRA is applied)
Figure 10:
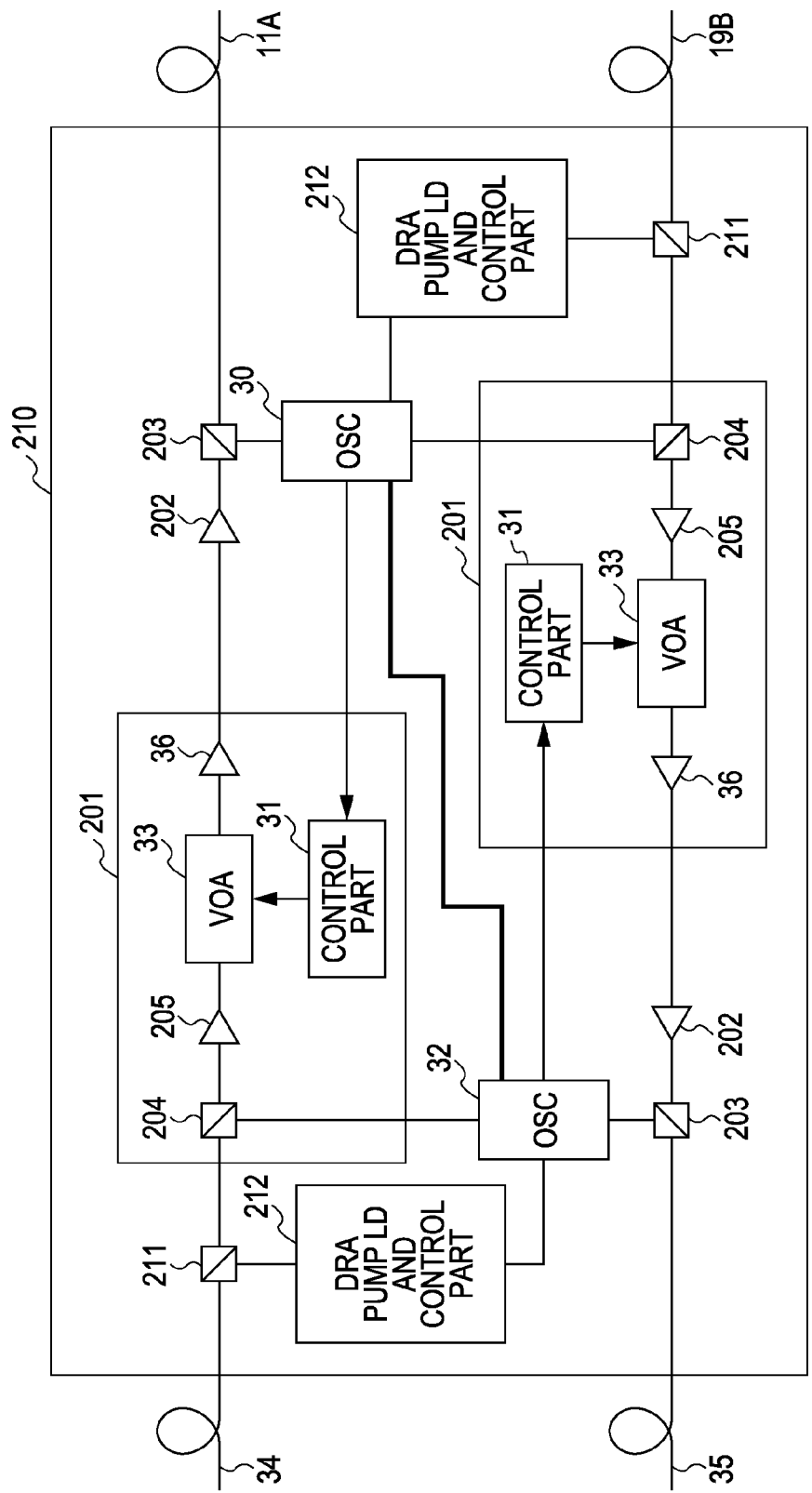
FIG. 10 is a diagram exemplifying the configuration of an ILA node (DRA is applied)

FIG. 9 is a diagram exemplifying the configuration of an OADM node in the present embodiment (an OADM node to which DRA is applied). An OADM node 140 shown in FIG. 10 is different from the OADM node 100 shown in FIG. 3 in the following points.

The first unit (up direction) and the second unit (down direction) each have a multiplexer 141 and a Distributed Raman Amplifier (DRA) pump laser diode and control part 142 (hereinafter, referred to as the "DRA unit 142") provided therein.

The multiplexer 141 is arranged on a transmission path of a WDM signal between the transmission path 11A (19A) and the amplifier unit 112. Each of the DRA units 142 in the first and second units is connected to the operation part 16, the OSC processing part 18, and the multiplexer 141.

The DRA unit 142 has a DRA pump LD and a control part thereof (DRA control part, which corresponds to a laser control part). The DRA control part receives the tilt correction amount to be performed in the OADM from the operation part 16 and drives the DRA pump LD with the amount of control in accordance with the tilt correction amount. The DRA pump LD outputs excitation light for amplifying a desired wavelength in a WDM signal transmitted through the transmission path 11A under control of the DRA control part. The excitation light is sent out to the transmission path 11A by the multiplexer 141 (back excitation). In this manner, the DRA unit 142 amplifies wavelengths having lower power so that power of each wavelength in the WDM signal becomes flat. The DRA unit 142 is configured to make the above tilt correction for a predetermined period.

Excluding the above points, the OADM node 140 has the same configuration as that of the OADM node 100 in the above-described embodiment. However, tilt corrections by the DRA unit 142 and those by the amplifier unit 112 (the VOA 22) are selectively made and tilt corrections by the DRA unit 142 take precedence over those by the VOA 22.

The operation part 16 has, for example, a flag concerning tilt corrections by the DRA unit 142. The operation part 16 references the flag when transmitting the tilt correction amount to determine the transmission destination of the tilt correction amount. When the flag is Off, the operation part 16 transmits the tilt correction amount to the DRA unit 142. Accordingly, tilt corrections by the DRA unit 142 are made for a predetermine period. When tilt corrections for a predetermined period are completed, the DRA unit 142 provides a completion notification to the operation part 16. Then, the DRA unit 142 sets the flag to On.

Subsequently, the operation part 16 calculates the tilt correction amount and references the flag before transmission. If, at this point, the flag is On, the operation part 16 transmits the tilt correction amount to the control part 20 of the amplifier unit 112. Accordingly, tilt corrections by the VOA 22 of the amplifier unit 112 are made for a predetermine period. When tilt corrections using the VOA 22 are completed, the operation part 16 sets the flag to Off. The flag is set to Off, for example, after receiving a completion notification from the control part 20. However, the operation part 16 may have a timer for measuring a predetermined time so that the flag is set to Off by measuring a predetermine time of the timer.

FIG. 10 is a diagram exemplifying the configuration of an ILA node in the present embodiment (an ILA node to which DRA is applied). An ILA node 210 shown in FIG. 10 is different from the ILA node 200 shown in FIG. 4 in the following points.

The first unit (up direction) and the second unit in the ILA node 210 each have a multiplexer 211 and a DRA pump LD and control part 212 (hereinafter, referred to as the "DRA unit 212") provided therein.

The multiplexer 211 is arranged on a transmission path of a WDM signal between the transmission path 34 (19B) and the amplifier unit 201. Each of the DRA units 212 in the first and second units is connected to the operation part 16, the OSC processing part 30 (32) and the multiplexer 211.

The DRA unit 212 has a DRA pump LD and a control part thereof (DRA control part). The DRA control part of the first unit is capable of receiving the tilt correction amount from the OADM node (or a downstream ILA node) input on a route of the transmission path 19B, the demultiplexer 204, the OSC processing part 30, and the OSC processing part 32 in this order. The DRA control part drives the DRA pump LD with the amount of control in accordance with the received tilt correction amount. The DRA pump LD outputs excitation light for amplifying a desired wavelength in a WDM signal transmitted through the transmission path 34 under control of the DRA control part. The excitation light is sent out to the transmission path 34 by the multiplexer 211 (back excitation). A similar operation is performed also in the DRA unit of the second unit. In this manner, the DRA unit 212 amplifies wavelengths having lower power so that power of each wavelength in the WDM signal becomes flat. The DRA unit 212 thus makes tilt corrections.

Excluding the above points, the ILA node 210 has the same configuration as that of the ILA node 200 in the embodiment shown in FIG. 4. However, tilt corrections by the DRA unit 212 and those by the amplifier unit 201 (the VOA 33) are selectively made and tilt corrections by the DRA unit 212 take precedence over those by the VOA 33.

Each of the OSC processing part 30 and the OSC processing part 32 has a flag concerning tilt corrections by the DRA unit 142 in the first unit (up direction). Like the embodiment shown in FIG. 4, the OSC processing part 30 transfers the tilt correction amount to the OSC processing part 32 to transfer the tilt correction amount to the upstream side. Depending on the state of flag, on the other hand, the OSC processing part 30 performs a transfer process of the tilt correction amount to the control part 31. That is, if the flag is Off, the OSC processing part 30 does not transfer the tilt correction amount to the control part 31. If the flag is Off, the OSC processing part 32, on the other hand, provides the tilt correction amount received from the OSC processing part 30 to the DRA unit 212 so that the DRA unit 212 makes tilt corrections for a predetermined period. When tilt corrections for a predetermined period are completed, the DRA control part of the DRA unit 212 provides a completion notification to the OSC processing part 32, and the OSC processing part 32 sets the flag thereof to On. The completion notification is also provided from the OSC processing part 32 to the OSC processing part 30 and, after receiving the completion notification, the OSC processing part 30 sets the flag thereof to On.

When the flag is set to On, the OSC processing part 30 is set to transfer the tilt correction amount also to the control part 31. If the flag is set to On, on the other hand, the OSC processing part 32 is set not to transfer the DRA control part of the DRA unit 212. Then, tilt corrections by the VOA 33 of the amplifier unit 201 are made for a predetermined period. When tilt corrections for a predetermined period are completed, the control part 31 provides a completion notification to the OSC processing part 30, and the OSC processing part 30 sets the flag thereof to Off. The OSC processing part 30 provides a completion notification to the OSC processing part 32, and the OSC processing part 32 sets the flag thereof to Off. In this manner, tilt corrections by the DRA unit 212 and those by the amplifier unit 201 are made alternately. At this point, tilt corrections by the DRA unit 212 take precedence. Also in the second unit (down direction), transfer control of the tilt correction amount based on the above flag and tilt correction processing are performed.

Incidentally, tilt corrections by the DRA unit 212 and those by the VOA 33 do not need to be necessarily performed alternately, and tilt corrections by the DRA unit 212 or the VOA 33 may be repeated a plurality of times.

Figure 11:
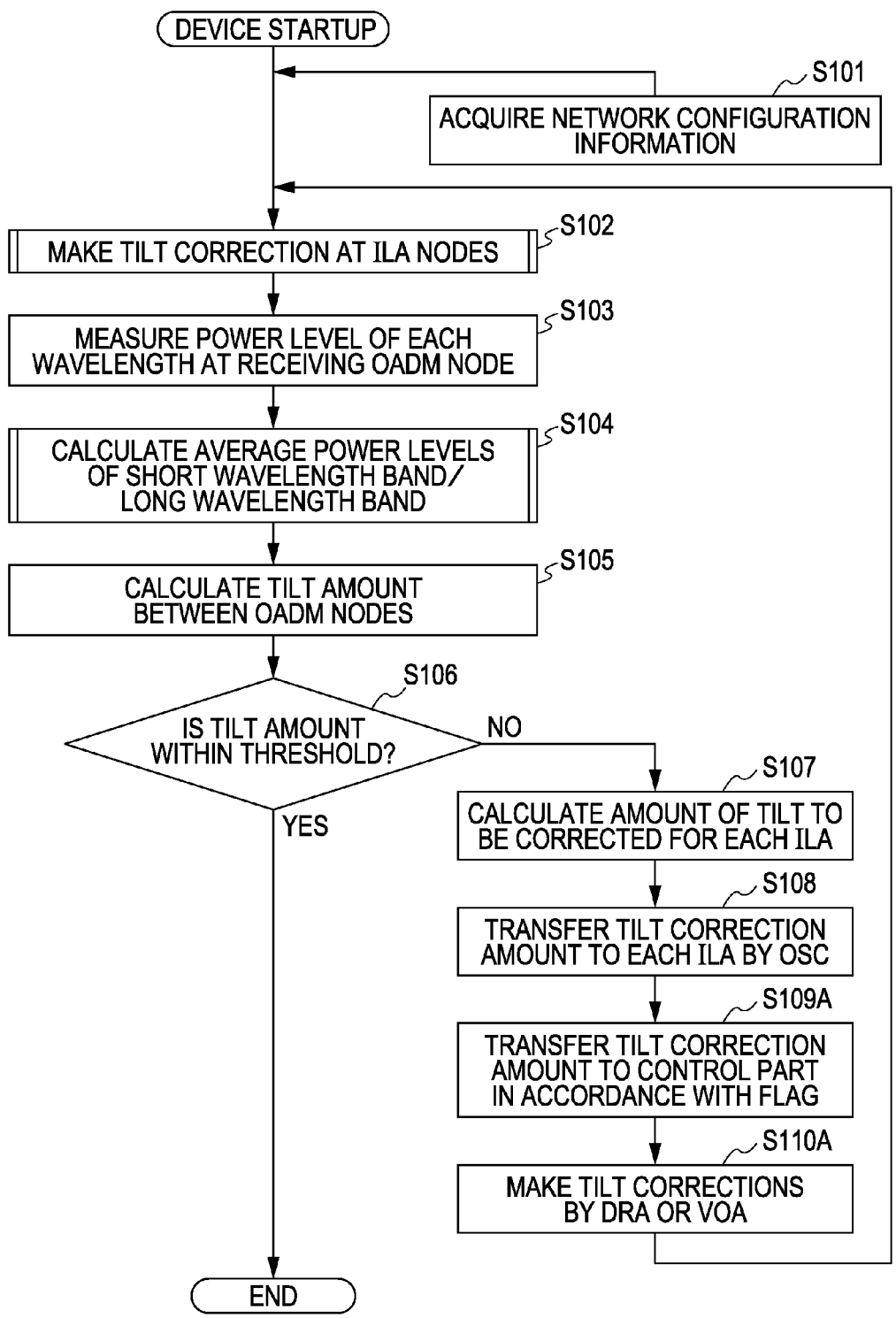
FIG. 11 is a flow chart showing an example of tilt correction processing.

FIG. 11 shows a control flow chart involving tilt corrections in the present embodiment. The process at operations S101 to S108 shown in FIG. 11 is almost the same as that in the embodiment shown in FIG. 7. However, at operation S109A following operation S108, the operation part 16 transfers the tilt correction amount in accordance with the flag status. That is, if the flag is Off, the tilt correction amount is transferred to the DRA control part of the DRA unit 142 and, if the flag is On, the tilt correction amount is transferred to the control part 20 of the amplifier unit 112.

Then, at operation S110A, tilt corrections by the DRA unit 142 or the VOA 22 are made. Therefore, tilt corrections in the ILA node at operation S102 shown in FIG. 11 will be as follows. At operation S102 in the first iteration, tilt corrections are made by the VOA 33 according to the initial setting (default value) set for the ILA node 210. At operation S102 in the second iteration, tilt corrections using the DRA unit 212 are made based on the tilt correction amount notified from the OADM node 140. At operation S102 in the third iteration, tilt corrections by the amplifier unit 201 are made based on the tilt correction amount notified from the OADM node 140.

The ILA node 210 may be configured to make tilt corrections by both the DRA unit 212 and the amplifier unit 201 based on a notification of the tilt correction amount from the OADM node 140. That is, when the ILA node 210 receives the tilt correction amount from the OADM node 140, tilt corrections by the amplifier unit 201 may be made for a predetermined period after those by the ILA node 210 are made for a predetermined period until the next notification of the tilt correction amount is received.

In the above-described embodiment shown in FIG. 7, the amount of tilt is calculated by the reception part (the operation part 16 in FIG. 3) of the OADM node 100 and divided by the number of amplifiers (number of relay amplifiers (ILA nodes)+1) to obtain the correction amount. Or, as shown in FIG. 9, tilt corrections can also be made by mounting a Distributed Raman Amplifier in each OADM node and making a similar calculation. In this case, the correction amount of each node is calculated by using a calculation formula similar to that in the above embodiment.

More specifically, the following formula is used.

Average level of short wavelength band CHAve1 [dBm]=(CH$a$ monitor value+CH$b$ monitor value+ . . . +CH$g$ monitor value)/number of channels to be calculated (1)

(for example, CHa is CH1 and CHg is CH(m/2))

Average level of long wavelength band CHAve2 [dBm]=(CH$t$ monitor value+ . . . +CH$y$ monitor value+ . . . +CH$z$ monitor value)/number of channels to be calculated (2)

(for example, CHt is CH(m/2)+1 and CHz is CHm)

Correction amount of each node [dB]=initial tilt value [dB]/(number of ILA nodes between OADM nodes+1) (3)

In the OADM node 140 on the receiving side, the DRA control part of the DRA unit 142 controls DRA excitation light based on the correction amount of each ILA node 210. If tilt corrections are insufficient (tilt cannot be adequately removed) even after tilt corrections based on control of the DRA pump LD (the DRA unit 142) inside the local node are made, it is preferable to perform control similar to that in a first embodiment using the ILA node 210 and the OADM node 140 on the receiving side. Thus, tilt corrections by the amplifier unit 201 may be made in accordance with a result of tilt corrections by the DRA unit 212.

In this manner, OSNR improvement by an increased input level of EDFA and suitable OSNR of a received WDM signal can be achieved by suitable tilt corrections being made by ILA nodes and an OADM node on the receiving side provided with DRA, leading to improved transmission characteristics of the WDM signal.

Before calculating the tilt correction amount and making a notification thereof to the ILA node 140, the operation part 16 may cause the DRA unit 142 to make tilt corrections and, only if the tilt amount does not fall within a threshold after the tilt corrections, the tilt correction amount may be calculated to make a notification thereof to the ILA node. While an example in which the ILA node 140 having the DRA unit 212 is applied is shown in a second embodiment, the ILA node 200 described in the first embodiment may be applied, instead of the ILA node 140. Conversely, the ILA node 210 described in the second embodiment may be used for the OADM node 100 in the first embodiment.

In the embodiment described above, the tilt amount is calculated by the reception part (the operation part 16) of the OADM node 100 and divided by the number of amplifiers (number of relay amplifiers (ILA nodes)+1) to obtain the correction amount. Or, tilt corrections can also be made by mounting a spectrum analyzer on each OADM node and performing a similar calculation. In this case, the correction amount of each node is calculated by using a calculation formula similar to one described above.

More specifically, the following formula is used.

Average level of short wavelength band CHAve1 [dBm]=(CH$a$ monitor value+CH$b$ monitor value+ . . . +CH$g$ monitor value)/number of channels to be calculated (1)

(for example, CHa is CH1 and CHg is CH(m/2))

Average level of long wavelength band CHAve2 [dBm]=(CH$t$ monitor value+ . . . +CH$y$ monitor value+ . . . +CH$z$ monitor value)/number of channels to be calculated (2)

(for example, CHt is CH(m/2)+1 and CHz is CHm)

Correction amount of each node [dB]=initial tilt value [dB]/(number of ILAs between OADM nodes+1)

Figure 12:
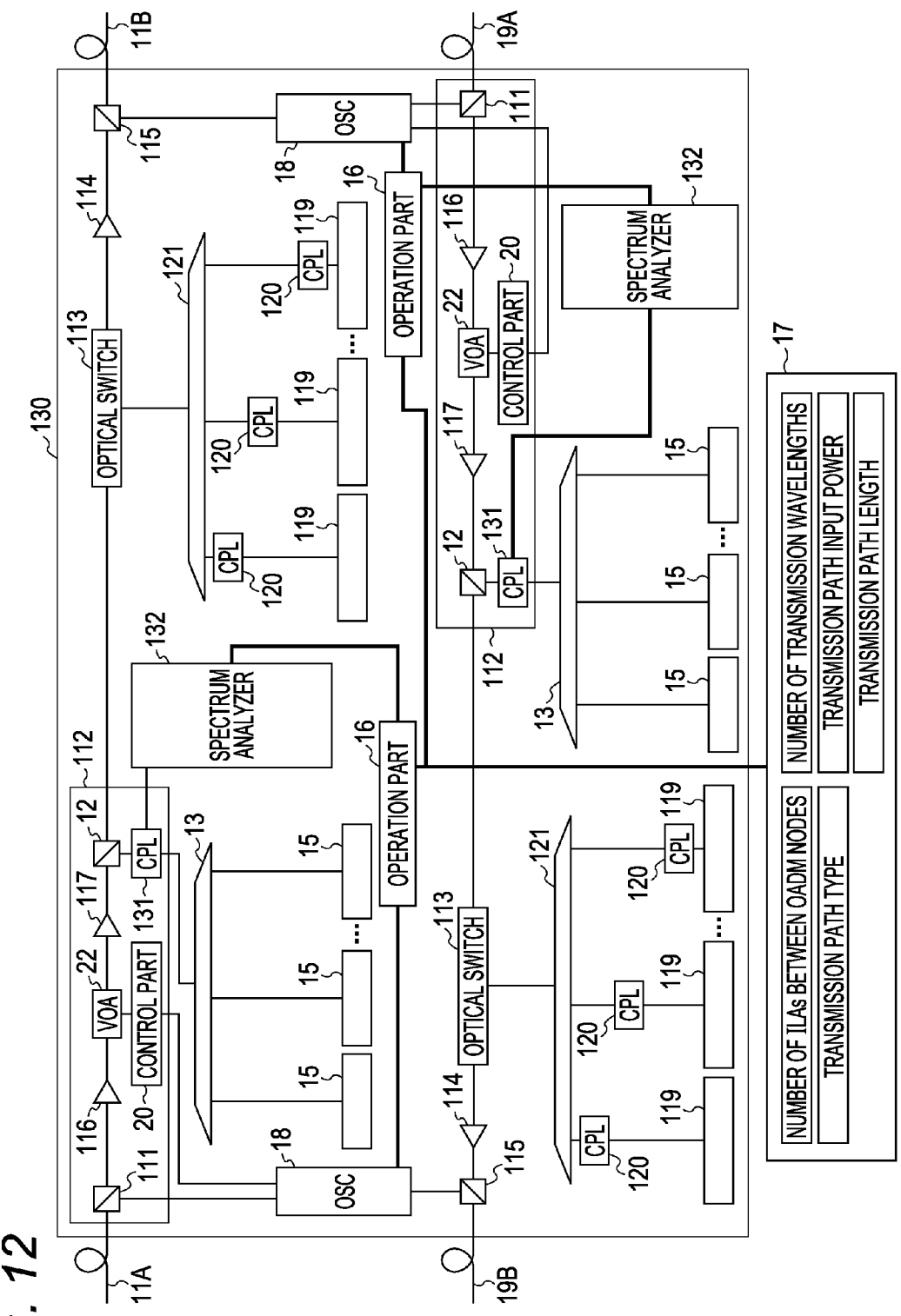
FIG. 12 is a diagram exemplifying the configuration of an OADM node (a spectrum analyzer is applied).

FIG. 12 is a diagram exemplifying the configuration of an OADM node (an OADM node to which a spectrum analyzer is applied) in the present embodiment. An OADM node 130 shown in FIG. 12 is different from the OADM node 100 shown in FIG. 3 in the configuration of the first unit involving a WDM signal in the up direction as follows.

That is, instead of the optical coupler (CPL) 118 between the demultiplexer 13 and each of the receivers 15, an optical coupler (CPL) 131 is inserted between the optical splitter 12 and the demultiplexer 13. One of a WDM signal branched by the optical coupler (CPL) 131 is input to a spectrum analyzer 132. The spectrum analyzer 132 measures the optical power level of each wavelength in the WDM signal and input measurement results to the operation part 16. Thus, the monitor PD 14 for each wavelength is omitted from the OADM node 130.

Based on measurement results of the power level of each wavelength by the spectrum analyzer 132, the operation part 16 makes tilt corrections using the process described in the above embodiment. Excluding the above point, the configuration of the OADM node 130 in FIG. 12 is the same as that of the OADM node 100 in FIG. 3. By applying the OADM node 130 in FIG. 12, similar operations and effects as those of the above embodiment can be achieved.

The configuration of each embodiment described above may be combined as needed without departing from the scope of the present invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical transmission apparatus, comprising:
a receiver that receives a wavelength division multiplexed (WDM) signal reached via one or more relay nodes being connected in a ring shape, each of the relay nodes including an optical amplifier, the receiver including a variable optical attenuator (VOA) that makes a tilt-correction to the received WDM signal in accordance with a given amount;
a monitor that measures an optical power level of each wavelength of the WDM signal received by the receiver;
a distributed Raman amplifier (DRA) pump laser that makes a tilt-correction to the WDM signal received by the receiver in accordance with a given amount;
a first processor that determines whether a tilt amount indicating an amount of tilt of the WDM signal calculated based on measurement results of the monitor is suitable or not, and calculates a node tilt-correction amount to be applied to tilt-correction processing performed by the optical amplifier of the each relay node when the tilt amount is not suitable; and
a second processor that performs transferring the calculated node tilt-correction amount to the each relay node, wherein
the first processor calculates the tilt amount and the node tilt-correction amount in such a manner that:
short and long wavelength bands are defined so that the short wavelength band includes wavelengths shorter than wavelengths included in the long wavelength band;
first and second average power levels are calculated by averaging the monitored optical power levels of wavelengths included in the short and long wavelength bands, respectively;
the tilt amount is obtained by subtracting the first average power level from the second average power level;
the node tilt-correction amount is obtained by dividing the tilt amount by the number of the one or more relay nodes between an optical add drop multiplexer (OADM) transmitting node and an OADM receiving node plus 1; and
the first processor selects, depending on each of predetermined time periods, one of the VOA and the DRA pump laser so that a tilt-correction to the received WDM signal is made, by the selected one of the VOA and the DRA pump laser, in accordance with the calculated node tilt-correction amount, during the each of the predetermined time periods.

2. The optical transmission apparatus according to claim 1, wherein
the monitor includes a spectrum analyzer to measure an optical power level of each wavelength in the WDM signal.

3. The optical transmission apparatus according to claim 1, wherein
the second processor transfers the node tilt-correction amount to the each node using an optical supervisory channel.

4. An optical transmission system, comprising:
an optical transmission node comprising:
a first receiver that receives a wavelength division multiplexed (WDM) signal reached via one or more optical relay nodes being connected in a ring shape, the first receiver including a first variable optical attenuator (VOA) that makes a tilt-correction to the received WDM signal in accordance with a given amount;
a monitor that measures an optical power level of each wavelength of the WDM signal received by the receiver;
a first distributed Raman amplifier (DRA) pump laser that makes a tilt-correction to the WDM signal received by the receiver in accordance with a given amount;
a first processor that determines whether a tilt amount indicating an amount of tilt of the WDM signal calculated based on measurement results of the monitor is suitable or not, and calculates a node tilt-correction amount to be applied to tilt-correction processing performed by the optical amplifier included in the each optical relay node when the tilt amount is not suitable; and
a second processor that performs transferring the calculated node tilt-correction amount to each of the one or more optical relay nodes; and
the one or more optical relay nodes each comprising:
an optical amplifier that amplifies a wavelength division multiplexed (WDM) signal input and outputs the amplified wave length division multiplexed (WDM) signal;
a second receiver that receives the node tilt-correction amount calculated based on the wavelength division multiplexed (WDM) signal received by the optical transmission node;
a second variable optical attenuator (VOA) that makes tilt-corrections to the WDM signal received by the optical amplifier in accordance with a given amount; and
a second DRA pump laser that makes a tilt-correction to the WDM signal received by the optical amplifier in accordance with a given amount, wherein
the first processor calculates the tilt amount and the node tilt-correction amount in such a manner that:
short and long wavelength bands are defined so that the short wavelength band includes wavelengths shorter than wavelengths included in the long wavelength band;

first and second average power levels are calculated by averaging the monitored optical power levels of wavelengths included in the short and long wavelength bands, respectively;

the tilt amount is obtained by subtracting the first average power level from the second average power level;

the node tilt-correction amount is obtained by dividing the tilt amount by the number of the one or more optical relay nodes between an OADM transmitting node and an OADM receiving node plus 1;

the first processor selects, depending on each of first predetermined time periods, one of the VOA and the DRA pump laser so that a tilt-correction to the received WDM signal is made, by the selected one of the first VOA and the first DRA pump laser, in accordance with the calculated node tilt-correction amount, during the each of the first predetermined time periods; and each of the one or more optical relay nodes selects, depending on each of second predetermined time periods, one of the second VOA and the second DRA pump laser so that a tilt-correction to the received WDM signal is made, by the selected one of the second VOA and the second DRA pump laser, in accordance with the calculated node tilt-correction amount, during the each of the second predetermined time periods.

* * * * *